(12) United States Patent
Fervel et al.

(10) Patent No.: US 8,430,354 B2
(45) Date of Patent: Apr. 30, 2013

(54) FLIGHT CONTROL SYSTEM FOR AN AIRCRAFT

(75) Inventors: Marc Fervel, Toulouse (FR);
Jean-Louis Lando, Saverdun (FR);
Alexandre Gentilhomme, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 299 days.

(21) Appl. No.: 12/683,031

(22) Filed: Jan. 6, 2010

(65) Prior Publication Data

US 2010/0170983 A1    Jul. 8, 2010

(30) Foreign Application Priority Data

Jan. 8, 2009 (FR) ..................................... 09 50080

(51) Int. Cl.
*B64C 19/00* (2006.01)
(52) U.S. Cl.
USPC ............................... 244/75.1; 244/58; 244/60
(58) Field of Classification Search .................... 244/60, 244/58, 53 R, 75.1, 217, 218, 76 RR, 99.4, 244/76 R
See application file for complete search history.

(56) References Cited

U.S. PATENT DOCUMENTS

| | | | |
|---|---|---|---|
| 5,387,859 A * | 2/1995 | Murugan et al. ................. | 322/10 |
| 6,467,725 B1 * | 10/2002 | Coles et al. ..................... | 244/58 |
| 6,690,588 B2 * | 2/2004 | York ................................ | 363/65 |
| 2005/0082427 A1 | 4/2005 | Seung | |
| 2006/0012177 A1 | 1/2006 | Hoppe | |
| 2006/0061213 A1 | 3/2006 | Michalko | |

FOREIGN PATENT DOCUMENTS

FR    2 911 847 A1    8/2008

OTHER PUBLICATIONS

Lester Faleiro, "Beyond the More Electric Aircraft", Aerospace America, XP-002541982, vol. 47, No. 6, Jun. 1, 2005, pp. 35-40.
Graham Warwick, "Lockheed Martin to fly all-electric F-16", Flight International, Reed Business Information, XP 000692734, vol. 151, No. 4578, Jun. 11, 1997, p. 28.
U.S. Appl. No. 13/255,778, filed Sep. 9, 2011, Fervel, et al.
U.S. Appl. No. 13/255,406, filed Sep. 8, 2011, Fervel, et al.

* cited by examiner

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

Power takeoff means (46, 47, 60, 61) for this flight control system adjacent to the aircraft engines (41, 42) are all-electric and this makes it possible to reduce the length of hydraulic connections leading to actuators of the controlled devices (54, 55, 66). Electrical generators are of different types to minimize the risk of a generic failure. Characteristically of the invention, some generators (60, 61) have a constant voltage to frequency ratio and directly or almost directly control electrohydraulic pumps (64, 65), without modifying the current characteristic and with no power electronics. Furthermore, system reconfigurations are made possible by additional electrical connections (69, 70, 71, 72) in case of failure.

11 Claims, 5 Drawing Sheets

FLIGHT CONTROL SYSTEM FOR AN AIRCRAFT

Figure 1:
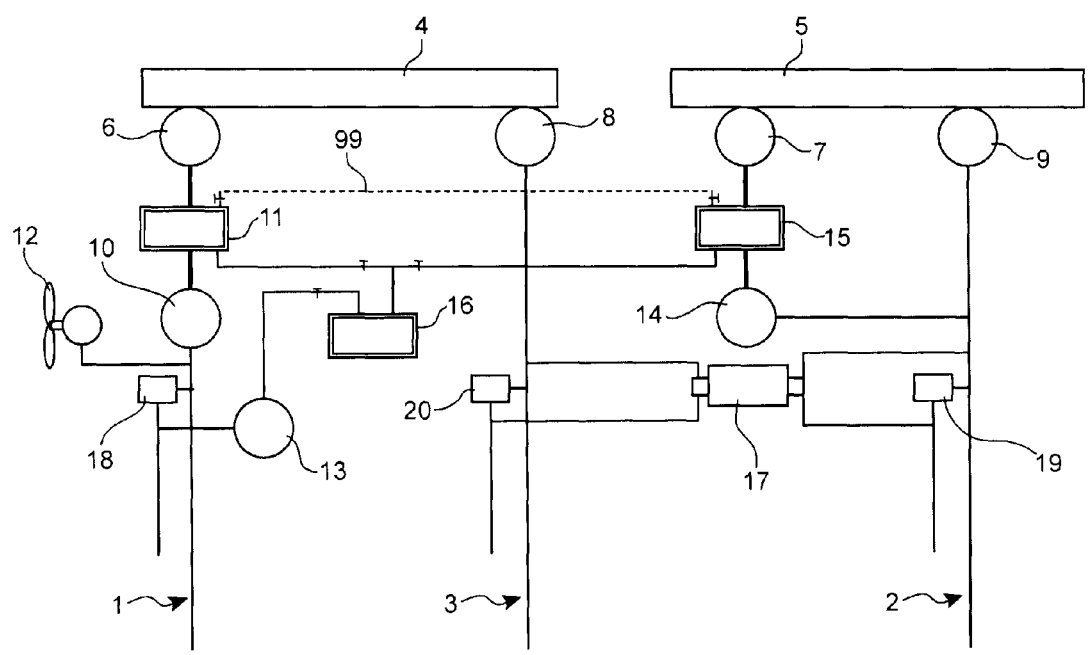

This invention relates to a flight control system for an aircraft.

Flight control systems comprise means necessary for the displacement of some mobile parts of aircraft, such as steering devices and landing gear among others. They comprise a plurality of circuits to maintain the division and redundancy necessary for safety. Each circuit comprises in particular at least one power takeoff device adjacent to the engines, actuators adjacent to the controlled devices and intermediate energy transmission and conversion devices. There are three hydraulic circuits, namely circuits provided with hydraulic actuators, or two hydraulic circuits and at least two electric circuits that power electrical actuators in flight control systems currently used on commercial aircraft.

Hydraulic actuators are powered by hydro-mechanical (EDP) pumps directly connected to an accessory gearbox fitted on each engine and provided with a reduction gear. They may also be powered by electro-hydraulic pumps (EMP) that are then separated from the engines by electrical power supply devices that may be in one of two categories, namely integrated drive generators (IDG) that supply three-phase AC voltage at a fixed frequency and constant rms value, or power electronic devices that convert DC voltage into AC voltage necessary to control the electric pump motors.

In the case of electric circuits, the actuators are controlled either by IDG generators at a fixed frequency voltage with a constant rms value, or by VFG generators at a variable frequency three-phase AC voltage with a constant rms value. IDG generators have the advantage that they do not always require power electronics on the actuators that they control because they output current with constant characteristics, but they have the disadvantages of being expensive and having a lower efficiency, while VFG generators always require the use of power electronics on actuators to control their electric motors at a suitable rotation speed, giving a sufficient torque to activate the controlled devices. In practice, electro-hydraulic pumps controlled by IDG generators are used redundantly with hydro-mechanical pumps in existing systems for safety reasons, and VFG generators are not widely used because electro-hydraulic pumps, that are still preferred to control some devices due to the greater reliability of hydraulic actuators, are more easily controlled by IDG generators with no power electronics.

Existing flight control systems have some disadvantages. Thus, hydraulic systems make it essential to install pipes using precise alignments separated from other equipment. Therefore they are complicated, heavy and expensive and also require tedious verification and maintenance operations. Temperature rises are particularly harmful for the hydraulic fluid which can then become acid, thus creating risks of damaging the systems. Fluids have to be replaced more frequently. But electrical systems also have disadvantages because they produce large temperature rises that cannot always be dissipated in the surrounding air or by surrounding structures in the aircraft, particularly at the location of electric motors. The power electronics for these motors, compulsory with most electricity generators, increase the volume of the actuators and make their integration more difficult. The power electronics themselves dissipate a large amount of energy and are affected by temperature cycles that themselves may cause expansion and generate mechanical fatigue stresses on electronic elements. These difficulties are greater with thinner structures and wings made of carbon, since the heat dissipation capabilities of carbon are lower. The reliability of electro-mechanical actuators is lower due to the obligation to convert rotation movements output from electric motors into translation movements of the active element, typically an actuator rod, with an intermediate transmission and greater risks of seizure.

Weight and complexity disadvantages of existing systems are particularly important when circuits have to be doubled up for redundancy purposes to guard against engine failures or individual circuit failures.

Although all systems have some disadvantages, progress could be made in reducing the number of hydraulic pipes onboard an aircraft, and risks of degradation of the hydraulic fluid due to the temperature rise.

The state of the art includes exclusively or almost exclusively electrical flight control systems, at least in the design stage, to eliminate these disadvantages.

The invention relates to such a flight control system in which hydraulic elements in the engine zones are eliminated and all aircraft engine power takeoff devices output electrical energy to the circuits.

Therefore, all circuits in the flight control system are initially electrical, but they are not necessarily all-electric due to the disadvantages inherent to electrical actuators and particularly their lower reliability. This is why at least some of the circuits finish on hydraulic actuators and comprise an intermediate means for conversion from electrical energy to hydraulic energy.

There are two different categories of power takeoff means, to eliminate the risk of generic failures that affect a particular category of these means; the means in the other category remain operational and maintain essential functions, including control of piloting the aircraft on all its axes, provided that control of the devices has been judiciously distributed between the different circuits.

The invention is innovative in that the power takeoff means include generators that output a current with a constant voltage to frequency ratio, and a variable frequency and variable voltage. These generators have the advantage that they can be connected to electro-hydraulic pumps without inserting any power electronics, the pump input shaft being controlled at a rotation speed that varies proportionally to the speed of the aircraft engines. This is true particularly if these electro-hydraulic pumps are of the permanent magnet type. The generators themselves may be of the permanent magnet type.

Prior art does not disclose and does not suggest any direct or almost direct electro-hydraulic pump control by such generators with a constant voltage to frequency ratio, and particularly without power electronics that would modify the characteristic of the current output by these generators.

Other power takeoff means may be chosen from among variable frequency and fixed voltage electrical generators, and fixed frequency and fixed voltage electrical generators.

Another major aspect of the invention is related to a judicious assignment of some of the controlled devices to some of the circuits. Thus, it is advantageous to control a main landing gear of the aircraft by a hydraulic actuator considered to be more reliable. An electric and hydraulic circuit, then provided with an electro-hydraulic pump, then advantageously serves this main landing gear and its actuator; some or possibly all other circuits, may then be all-electric as far as the actuators, to benefit from the lighter weight and greater ease of arrangement of purely electric circuits. Since they are less reliable, one particular advantageous design then consists of also serving devices that control piloting of the aircraft on all its axes by the electric and mechanical circuit as backup for all-electric circuits, either in the case of a failure or to relieve them by reducing their temperature rise.

One particularly reliable circuit includes a fork towards two of the power takeoff means connected to two of the engines, that are different. Each of the power takeoff means alone may contribute to the energy supply to the circuit, at least under normal circumstances, which reduces the risk of failures. In accordance with the considerations described above, such a circuit advantageously serves the aircraft main landing gear by means of electro-hydraulic pumps controlling hydraulic actuators.

According to another main aspect of the invention, some of the circuits that are all-electric as far as the actuators, are provided with an electrical current rectifier between the power takeoff means and the actuators, which can then be controlled by simplified power electronics.

According to another main aspect of the invention, electrical connections are made between the circuits so that the electrical power can be switched from one of the circuits to the other. This arrangement may concern similar circuits, in other words circuits provided with essentially the same equipment and that only control different devices. According to another more particular characteristic, it may also concern connections between variable frequency generators in some circuits and hydro-electrical pumps in other circuits, in order to control pumps by variable frequency generators without power electronics under special circumstances, particularly during takeoff, when variable frequency generators output a current that can be used directly by these pumps.

The invention also relates to an aircraft provided with such a flight control system.

Figure 2:
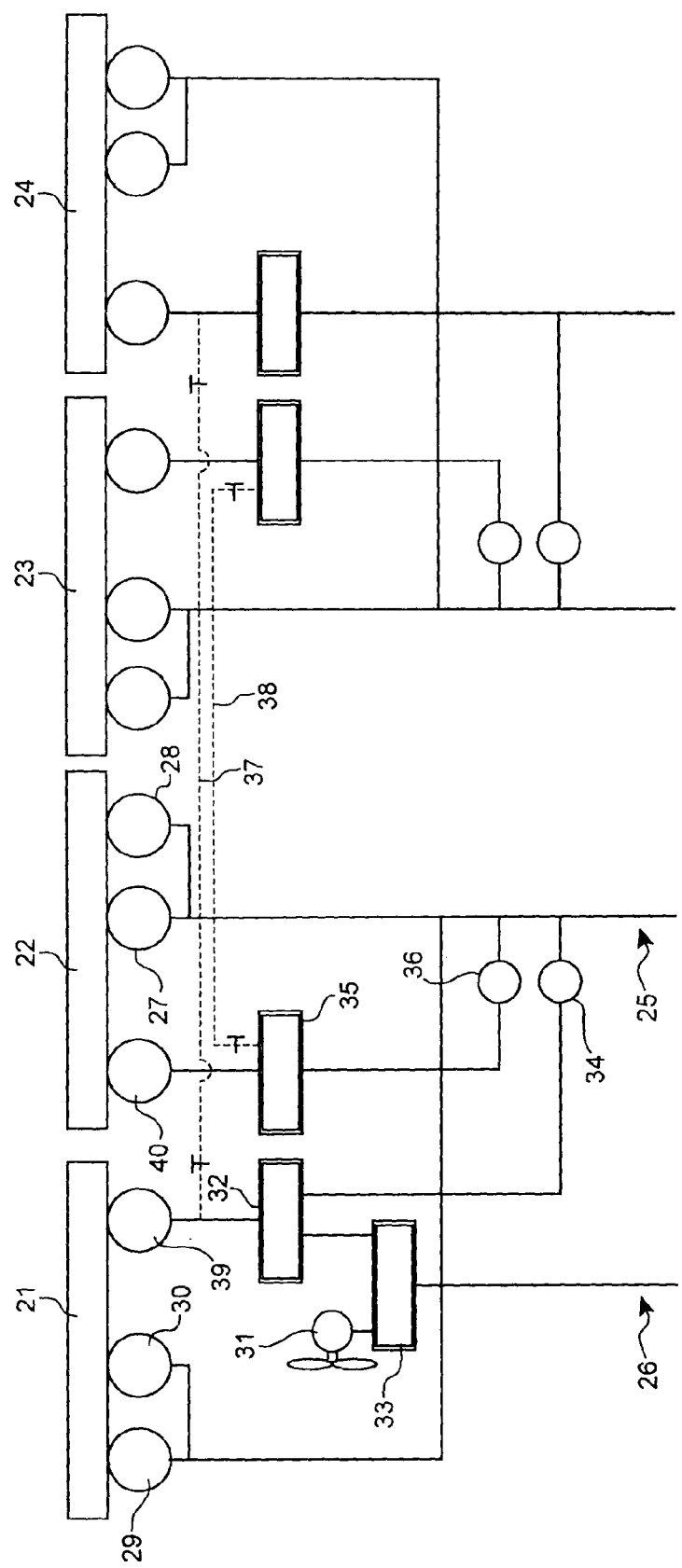
Figure 3:
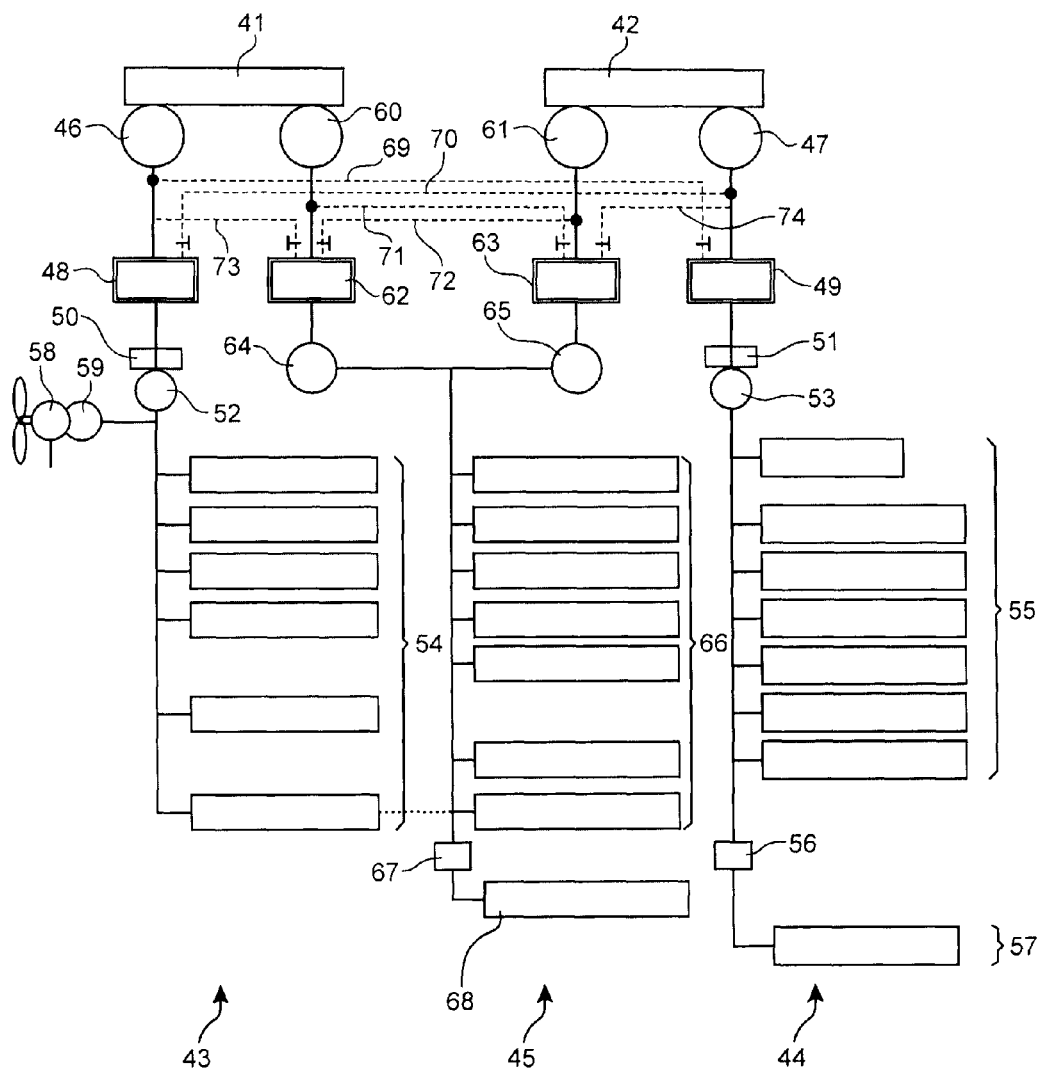
Figure 4:
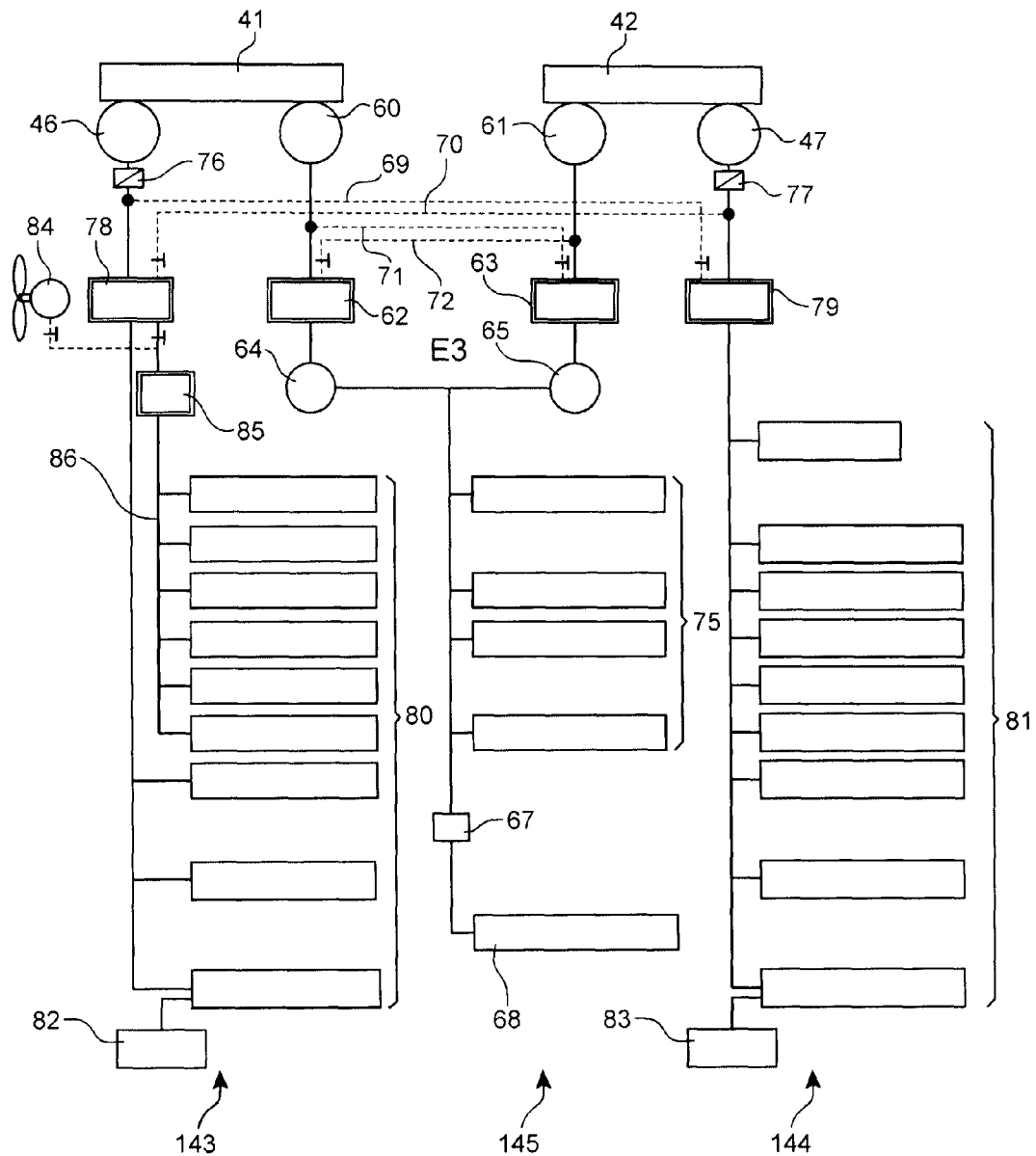
Figure 5:
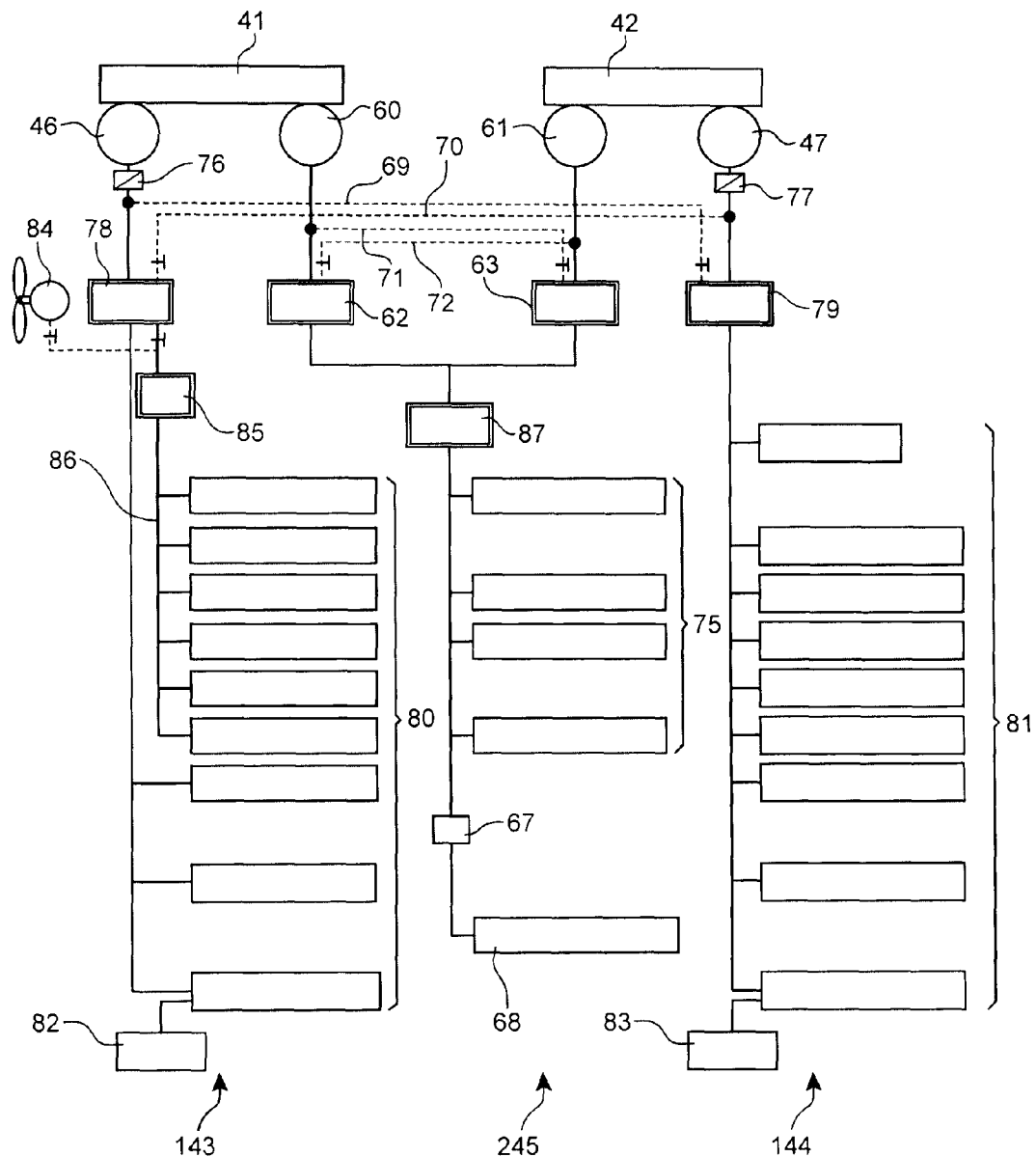

We will now describe the invention in more detail with reference to the following figures in which:

FIGS. 1 and 2 show two embodiments according to prior art, and FIGS. 3, 4, and 5 show three possible embodiments of the invention.

The previously known device in FIG. 1 (used on the Airbus A 320) comprises three circuits 1, 2 and 3 powered by two independent engines 4 and 5 on the aircraft. Power is taken off from each of the engines 4 and 5 by an integrated drive generator (IDG generator) 6 or 7 and by a hydro-mechanical pump 8 or 9. The generator 6 connected to the first engine 4 powers an electro-mechanical pump 10 that pressurises the fluid in the first circuit 1 through an electrical element 11 that outputs a constant frequency current. A ram air turbine RAT 12 powers a standby motor generator 13. The other generator 7 supplies energy to another auxiliary electro-hydraulic pump 14 that pressurises the fluid in the second circuit 2 under some conditions when the hydro-mechanical pump 9 connected to the same engine (the second engine 5) is not operating. An element 15 similar to element 11 is used. Elements 11 and 15 are connected through an electrical connection 99 so as to transfer the electrical power from one to the other at will when required by the circumstances. They can power another element 16 that under some conditions can also be powered by the generator 13 entrained by the hydraulic fluid flow from circuit 1. Finally, the hydro-mechanical pump 8 entrained by the first engine 4 pressurises the fluid in the third circuit 3. The power of the hydro-mechanical pumps 8 and 9 may be switched to one or the other of the second and third circuits 2 and 3 by a power transfer unit 17. Each of the circuits 1, 2 and 3 is provided with a priority valve 18, 19 and 20 to transfer hydraulic energy to a standby branch of the circuit if necessary.

Another known example embodiment (used in the Airbus A 380) will be described briefly because it illustrates the use of electric circuits. It is shown in FIG. 2. The aircraft comprises four engines 21, 22, 23 and 24. The description will be given for only half of the system, for example dependent on the first two engines 21 and 22, because the other half is identical. Engines 21 and 22 power a first circuit (hydraulic circuit 25) and an electric circuit 26. Each drives a pair of hydro-mechanical pumps 27 and 28, or 29 and 30, all of which pressurise the fluid in the hydraulic circuit 25. Each of the engines 21 and 22 also drives a variable frequency generator (VFG) 39 or 40. The first generator 39 powers the electric circuit 26 concurrently with a ram air turbine 31 through electrical elements 32 and 33 that output a variable frequency. However, the generator 39 may also contribute to pressurisation of the fluid in the hydraulic circuit 25 by controlling an electro-hydraulic pump 34. The other variable frequency generator 40 is used for the same pressurisation function through an electrical element 35 that outputs a variable frequency and another electro-hydraulic pump 36. The electro-hydraulic pumps 34 and 36 are only used on the ground. Although the circuits dependent on the other engines 23 and 24 are independent of each other, there are electrical connections 37 and 38 between the variable frequency generators associated with the two electric circuits and between the other two generators, always to make variable frequency power transfers if necessary.

We will now describe a first embodiment of the invention with reference to FIG. 3. This embodiment was designed for an aircraft with two engines 41 and 42 and comprises three circuits 43, 44, and 45, all of which are electro-hydraulic. Each of the engines 41 and 42 powers a variable frequency generator 46 and 47 then an electro-hydraulic pump 52 or 53 that pressurises the fluid in the first circuit 43 and the fluid in the second circuit 44 respectively, through an electrical element 48 or 49 that outputs a variable frequency current, and power electronics 50 or 51. However, the first circuit 43 is provided with a ram air turbine 58 fitted with a pump and generator assembly 59 that provides the standby power supplies.

The first circuit 43 is used to control actuators and associated devices 54, in this case to control the left and right outer ailerons, the left and right spoilers 1 and 3, the rudder, left and right elevators, slats and slat brakes, and the second brake system. The second circuit 44 is designed to control other actuators and devices 55, in this case doors, the left and right spoilers 2 and 4, the rudder, the right elevator, the THSA actuator (adjusting the aircraft horizontal stabiliser), slats and slat brakes, flaps, the differential and flap brakes, and then the orientation of the forward wheels and manoeuvring of the nose landing gear (device 57) through a priority valve 56.

Engines 41 and 42 also power permanent magnet generators 60 and 61 respectively that control electro-hydraulic pumps 64 and 65 through electrical elements 62 and 63 that output a current with a constant frequency to voltage ratio, but with no power electronics. The electro-hydraulic pumps 64 to 65 pressurise the fluid in the third circuit 45 and control actuators and devices 66 such as the left and right ailerons, left and right spoilers 5, the rudder, the left elevator, the horizontal stabiliser adjustment THSA, flaps and flap brakes, the first brake system, and the main landing gear (device 68) through a priority valve 67.

This third circuit 45 is the most important because it retracts the main landing gear, controls piloting of the aircraft on all its axes, and controls braking and orientation of the wheels. Only one of the electro-hydraulic pumps 64 and 65 is normally active, the other being at rest and used only if necessary. No power electronics are necessary with the permanent magnet generators 60 and 61 that provide a constant voltage to frequency ratio combined with the electro-hydraulic pumps 64 and 65, also using permanent magnets. This would also be true with an IDG type generator (with fixed frequency and constant rms value), although IDG generators are not preferred for reliability and cost reasons; but power electronics would be necessary with constant voltage and variable frequency generators and DC generators. It is found that the permanent magnet generators 60 and 61 that output a frequency proportional to the rotation speed of the aircraft engine 41 or 42 enable a simple arrangement and are well adapted to in-flight control.

The first and second circuits 43 and 44 are also used to control piloting of the aircraft on all its axes, braking, nose landing gear functions and the control of doors. The choice of variable frequency generators 46 and 47 makes it necessary to use power electronics 50 and 51. The ram air turbine 58 is used as a last resort to maintain the aircraft piloting control.

Some advantages of this embodiment of the invention will be described in detail. Two different types of electrical generators (permanent magnet and variable frequency) are used which reduces the vulnerability of the system to generic failures for one category of generators and therefore maintains essential piloting functions in this case.

Characteristically of the invention, a combination of permanent magnet generators and electro-hydraulic pumps on a single circuit 45 makes it possible to simplify the construction due to the possibility of eliminating the power electronics, the electro-hydraulic pumps being controlled at an input shaft rotation speed that varies proportionally to the speed of the engines 41 or 42. Furthermore, the simple design of permanent magnet generators means that they have good reliability, which is reflected on the entire circuit that they control.

As already mentioned, the use of hydraulic circuits close to the hydro-mechanical pumps adjacent to the engine is disadvantageous due to installation constraints in the engine zone, the longer length of their hydraulic circuits and risks of degradation of the fluid due to engine temperature rises. The exclusive use of electrical generators can reduce the hydraulic length of the circuits, which only begins at pumps 52, 53 or 64, 65. These pumps may be placed anywhere in the aircraft, far away from the engines, close to the actuators or close to fluid reservoirs in order to significantly reduce the length of circuits, and they may be placed in locations in which their maintenance is easier and in which they are protected from damage in the case of an engine burst.

The joint use of two power generators (60 and 61) and two pumps (64 and 65) for the third circuit that serves the most essential elements such as the main landing gear, can give better reliability, only one of the energy sources and one of the pumps normally being used; since the original pump pipes come together again quickly, this design does not impose any large weight increase. Each pair is composed of one of the permanent magnet generators and one of the electro-hydraulic pumps 60, 64, 61 and 65, and is sized to satisfy ordinary consumption needs on the third circuit 45. The pairs composed of a generator and a pump may then be used alternately to increase their working life. They can be used simultaneously if necessary.

The system can be reconfigured in many ways in the case of a failure of one of the engines 41 or 42 or in special circumstances. Electrical connections 69, 70 combine the first circuit 43 on the output side of the generator 46 and the electrical element 49 of the second circuit 44, and vice versa, such that the first circuit 43 and the second circuit 44 may be powered by either of the variable frequency generators 46 and 47 indifferently. Other electrical connections 71 and 72 connect the permanent magnet generator 60 associated with the first engine 41 to the electrical element 63 on the output side of the other permanent magnet generator 61, and vice versa, to power each of the electro-hydraulic pumps 64 and 65 indifferently by either of the permanent magnet generators 60 and 61. Yet another possibility would be to arrange the electrical connections 73 and 74 between the variable frequency generators 46 and 47 and the control elements 62 and 63 of the electro-hydraulic pumps 64 and 65 so that these pumps are powered by the variable frequency generators 46 and 47 in specific situations such as during takeoff, when the high speed of the engines 41 and 42 make it possible to control these electro-hydraulic pumps 64 and 65 under good conditions through variable frequency generators 46 to 47, that then output a high voltage and frequency comparable to the values output by permanent magnet generators 60 and 61. Availability of the main landing gear control would be improved because the landing gear could be retracted using the electrical connections 73 and 74 under some failure conditions.

We will now describe a second embodiment of the invention with reference to FIG. 4. Some of these elements are identical to the elements in the first embodiment. Thus, on the output side of the engines 41 and 42, there are two variable frequency generators 46 and 47 that power a first circuit 143 and a second circuit 144 respectively, and two permanent magnet generators 60 and 61 that power a third circuit 145 in common. This third circuit 145 is absolutely identical to the third circuit 45 in the previous embodiment, and includes particularly electrical elements 62 and 63 and then electro-hydraulic pumps 64 and 65 on the output side of the permanent magnet generators 60 and 61, and a junction of the hydraulic pipes; only the actuators and devices 75 controlled by this third circuit 145 are different, there are fewer of them than in the previous embodiment; they may be left and right ailerons, the rudder, left and right elevators, slats and flaps and the main landing gear 68.

The first circuit 143 and the second circuit 144 are different from the circuits in the first embodiment. In this case they are all-electric, although they remain identical to each other. Each comprises a current rectification device 76 or 77, an electrical element 78 or 79 and controlled actuators and devices 80 and 81, of which those in the first circuit 143 may include the left and right ailerons, the left and right spoilers 1, 2 and 4, the rudder, the left elevator, the THSA, the slats, the thrust inverter of the first engine, a first nose landing gear actuator and the first brake system, on the output side of the variable frequency generator 46 or 47; and those in the second circuit 144 may include doors, left and right spoilers 3 and 5, the rudder, the right elevator, the THSA, the flaps, the second engine thrust inverter and the second brake system. The electrical connections 69, 70, 71 and 72, identical to those in the first embodiment, can be used to make the same electrical reconfigurations. The devices in the first circuit 143 and the second circuit 144 may also be powered by accumulators 82 and 83; and a ram air turbine 84 is added to the first circuit 143 to which it is connected on the output side of the element 78 in order to provide an emergency power supply for some of the controlled devices 80 such as the ailerons, spoilers, rudder, elevator, THSA and slats, through an element 85 and a forked branch 86.

This second embodiment of the invention including hybrid actuators, some electrical and others hydraulic, may be preferred if the electrical actuators are considered to be reliable as a whole, but it is preferred to keep hydraulic actuators for some functions such as control of the main landing gear. Each of the electric circuits (the first circuit 143 and the second circuit 144) alone is sufficient to control the aircraft on all its axes, and its braking and the functions of the nose landing gear. Most of the advantages of the first embodiment are equally applicable here, plus some others. The additional reduction in the hydraulic length of the circuits, two of which are now purely electrical, reduces the weight, dimensions and needs for maintenance of the system, and increases the layout flexibility even further. And in the case of purely electric circuits finishing on the electrical actuators, it is advantageous to operate on DC power in order to simplify the power electronics of each of the actuators, particularly by eliminating a rectification stage and reducing the electrical braking arms, transistors and resistances. The rectification devices 76 and 77 and the accumulators 82 and 83 enable these simplifications in the power electronics of each of the actuators 80. The weight of the actuators can then be reduced, particularly because they are less heated by electrical braking and therefore dissipate less heat and can be provided with lower power cooling devices. They are also made more reliable. It should also be added that electrical actuators are easier to install, remove and verify than hydraulic actuators, so that maintenance operations can be done much more quickly.

Therefore the use of purely electric circuits is the reason for preferring the second embodiment over the first. The joint presence of hydro-mechanical and electro-mechanical actuators has the same advantages if the hydraulic controls can perform the same main aircraft functions, particularly piloting control on all axes, because the hydraulic actuators 75 in the third circuit 145 can be used preferentially leaving the other two circuits at rest, which reduces the service provided by power electronics of electrical actuators, and consequently their wear and temperature rise.

We will now describe a third embodiment with reference to FIG. 5. In this case the entire hydraulic system is eliminated; the third circuit 145 in the second embodiment is replaced by a purely electrical system. It includes the power supply using permanent magnet generators 60 and 61 and electrical elements 62 and 63, and controlled devices 75 and 68 identical to those in the second embodiment, but the third circuit 245 is different from the above in that the electro-hydraulic pumps 64 and 65 are replaced by an electrical junction element 87 placed at the fork of the circuits and outputting a variable frequency and voltage, and in that the actuators of the controlled devices 75 and 68 are now electrical. The first circuit 143 and the second circuit 144 are identical to those in the previous embodiment. The electrical connections 69, 70, 71 and 72 that enable reconfigurations are also the same.

This third embodiment may be preferred if it is considered that the electrical actuators are sufficiently reliable to control all devices. The advantages of the previous embodiment, resulting from the reduction in the number and size of hydraulic components, are even greater. Note that the electrical element 87 outputting a variable frequency and voltage could be replaced by elements similar to those in the other circuits, so that a constant DC voltage can be output. The power electronics could then be similar for all actuators in the aircraft.

The invention could be used in other ways. Thus, despite their advantages, permanent magnet generators could be replaced by variable frequency generators. The system would be made more uniform and simpler, but it would have the disadvantage of vulnerability to generic failures. This is why different models of variable frequency generators would then be preferred.

The power supply to electro-hydraulic pumps using a variable frequency constant rms value AC voltage or a DC voltage requires the use of power electronics to control the phases of the electric motor and maintain sufficient torque, as mentioned in the description of FIG. 3. The reliability of this electronic power module may be penalising for the operational availability of the aircraft, for example at the electro-hydraulic generators of circuits 54 and 55. It may then be advantageous to duplicate it while maintaining the use of a single filter for which the reliability has proved to be acceptable. Failure of one of these duplicated modules would no longer provide a reason for aborting a takeoff.

The invention claimed is:

1. An aircraft flight control system comprising:
power takeoff means connected to engines of the aircraft;
actuators for driving mobile devices of the aircraft;
circuits connecting said power takeoff means to said actuators and transmitting energy for supplying said actuators with powering energy from said power takeoff means in which all the power takeoff means are electricity generators and all the circuits comprise an electricity transmission segment adjacent to the power takeoff means,
wherein the power takeoff means belong to two different categories and comprise at least one electrical generator outputting electricity having a variable frequency and variable amplitude voltage changing with a constant voltage-to-frequency ratio,
the actuators of the circuits connected to said at least one electrical generator comprise electro-hydraulic pumps, which are supplied with said electricity having a variable frequency and variable amplitude voltage changing with a constant voltage-to-frequency ratio,
said electrical generator outputting a variable frequency and variable amplitude voltage changing with a constant voltage-to-frequency ratio is connected to said electro-hydraulic pumps without power electronics, and
the electro-hydraulic pumps comprise input shafts that are controlled at a rotation speed varying proportionally to a speed of said engines of the aircraft.

2. The aircraft flight control system according to claim 1, wherein said electrical generator outputting a variable frequency and variable amplitude voltage changing with a constant voltage to frequency ratio is a permanent magnet generator.

3. The aircraft flight control system according to claim 2, wherein the electro-hydraulic pumps are of the permanent magnet type.

4. The aircraft flight control system according to claim 1, wherein the power takeoff means also comprise variable frequency and fixed voltage electrical generators, or fixed frequency and fixed voltage electrical generators.

5. The aircraft flight control system according to claim 1, wherein at least one circuit is all-electric as far as the actuators and at least one of the circuits is electric and hydraulic, provided with at least one electro-hydraulic pump, and the electric and hydraulic circuit supplies a main landing gear of the aircraft.

6. The aircraft flight control system according to claim 1, wherein at least one of the circuits comprises a fork to at least two of the power takeoff means, connected to two of the engines, said engines being different from each other, and said circuit comprises electro-hydraulic pumps and supplies a main landing gear of the aircraft.

7. The aircraft flight control system according to claim 6, wherein the electric and hydraulic circuit supplying the main landing gear also supplies devices for controlling piloting of the aircraft on all its axes, and the all-electric circuits also supply devices enabling control over piloting of the aircraft on all its axes.

8. The aircraft flight control system according to claim 1, further comprising electrical connections between circuits, enabling switching of electrical power from one of said circuits to another.

9. The aircraft flight control system according to claim 8, wherein electrical connections extend between frequency variable generators in some of the circuits and electro-hydraulic pumps in other circuits, and are used during the take-off phase to retract a main landing gear under some failure conditions.

10. An aircraft, comprising:
an aircraft control system, including
power takeoff means connected to engines of the aircraft;
actuators for driving mobile devices of the aircraft;
circuits connecting said power takeoff means to said actuators and transmitting energy for supplying said actuators with powering energy from said power takeoff means in which all the power takeoff means are electricity generators and all the circuits comprise an electricity transmission segment adjacent to the power takeoff means,
wherein the power takeoff means belong to two different categories and comprise at least one electrical generator outputting electricity having a variable frequency and variable amplitude voltage changing with a constant voltage-to-frequency ratio,
the actuators of the circuits connected to said at least one electrical generator comprise electro-hydraulic pumps, which are supplied with said electricity having a variable frequency and variable amplitude voltage changing with a constant voltage-to-frequency ratio,
said electrical generator outputting a variable frequency and variable amplitude voltage changing with a constant voltage-to-frequency ratio is connected to said electro-hydraulic pumps without power electronics, and
the electro-hydraulic pumps comprise input shafts that are controlled at a rotation speed varying proportionally to a speed of said engines of the aircraft.

11. The aircraft control system according to claim 1, wherein the electrical generator outputting electricity having a variable frequency and variable amplitude voltage changing with a constant voltage-to-frequency ratio is connected via one of the circuits to the highest priority actuators of the aircraft, including at least the main landing gear.

\* \* \* \* \*